United States Patent
Jariwala et al.

(10) Patent No.: US 9,791,106 B2
(45) Date of Patent: Oct. 17, 2017

(54) FLOATING LIQUEFIED NATURAL GAS PRETREATMENT SYSTEM

(71) Applicant: Cameron International Corporation, Houston, TX (US)

(72) Inventors: Ankur D. Jariwala, Katy, TX (US); Richard D. Peters, Katy, TX (US)

(73) Assignee: Cameron International Corporation, Houston, TX (US)

( * ) Notice: Subject to any disclaimer, the term of this patent is extended or adjusted under 35 U.S.C. 154(b) by 1150 days.

(21) Appl. No.: 13/707,171

(22) Filed: Dec. 6, 2012

(65) Prior Publication Data
US 2013/0139526 A1   Jun. 6, 2013

Related U.S. Application Data

(60) Provisional application No. 61/567,406, filed on Dec. 6, 2011.

(51) Int. Cl.
*F17C 13/08* (2006.01)
*B01D 53/22* (2006.01)
(Continued)

(52) U.S. Cl.
CPC ............ *F17C 13/082* (2013.01); *B01D 53/22* (2013.01); *F25J 1/0022* (2013.01); *F25J 1/0259* (2013.01);
(Continued)

(58) Field of Classification Search
CPC .... F25J 1/0022; F25J 2205/80; F25J 2205/60; F25J 2220/60; F25J 2220/66;
(Continued)

(56) References Cited

U.S. PATENT DOCUMENTS 5,248,488 A * 9/1993 Yan .................. C07C 7/005
                                                    423/210
5,669,959 A * 9/1997 Doshi .................. B01D 53/22
                                                    95/115
(Continued)

FOREIGN PATENT DOCUMENTS

CA    2698007 A1    9/2011
EP    0329301 A2    8/1989
(Continued)

*Primary Examiner* — Frantz Jules
*Assistant Examiner* — Webeshet Mengesha
(74) *Attorney, Agent, or Firm* — Gable Gotwals

(57) ABSTRACT

A pretreatment system and method for a floating liquid natural gas ("FLNG") facility are presented. The inlet natural gas stream flows through a membrane system to remove carbon dioxide and a heat exchanger, producing first and second cooled $CO_2$-depleted non-permeate streams. The first cooled $CO_2$-depleted non-permeate stream is routed to additional pretreatment equipment, while the second cooled $CO_2$-depleted non-permeate stream is routed directly to a LNG train. Alternatively, the inlet natural gas stream may flow through a membrane system to produce a single cooled $CO_2$-depleted non-permeate stream that is routed to the LNG train after sweetening and dehydration. Because the pretreatment system delivers the incoming gas stream to the LNG train at a lower temperature than conventional systems, less energy is needed to convert the gas stream to LNG. In addition, the pretreatment system has a smaller footprint than conventional pretreatment systems.

7 Claims, 2 Drawing Sheets

(51) Int. Cl.
*F25J 1/00* (2006.01)
*F25J 1/02* (2006.01)
*C10L 3/10* (2006.01)

(52) U.S. Cl.
CPC ....... *F25J 1/0278* (2013.01); *B01D 2256/245* (2013.01); *B01D 2257/304* (2013.01); *B01D 2257/504* (2013.01); *B01D 2257/602* (2013.01); *B01D 2257/80* (2013.01); *C10L 3/101* (2013.01); *C10L 3/104* (2013.01); *F25J 2205/60* (2013.01); *F25J 2205/80* (2013.01); *F25J 2220/60* (2013.01); *F25J 2220/66* (2013.01); *F25J 2220/68* (2013.01); *Y02C 10/10* (2013.01)

(58) Field of Classification Search
CPC .................. F25J 2220/68; B01D 53/64; B01D 2256/245; B01D 2257/304; B01D 2257/504; B01D 2257/602
USPC .................................................. 62/611, 53.2
See application file for complete search history.

(56) References Cited

U.S. PATENT DOCUMENTS

| | | |
|---|---|---|
| 5,785,739 A | 7/1998 | Baker |
| 6,053,965 A | 4/2000 | Lokhandwala |
| 2002/0170430 A1 | 11/2002 | Baker et al. |
| 2010/0077796 A1 | 4/2010 | Gadre et al. |
| 2010/0126909 A1* | 5/2010 | Bhasin ............... B01D 15/00 208/135 |
| 2010/0186586 A1 | 7/2010 | Chinn et al. |
| 2011/0239700 A1* | 10/2011 | Hasse ............... B01D 53/002 62/617 |
| 2011/0290111 A1* | 12/2011 | Dunne ............ B01D 53/1443 95/51 |
| 2012/0000359 A1* | 1/2012 | Bresler ............... B01D 53/75 95/51 |
| 2012/0111051 A1* | 5/2012 | Kulkarni ............ B01D 53/229 62/619 |

FOREIGN PATENT DOCUMENTS

| | | |
|---|---|---|
| JP | 2005290151 A | 10/2005 |
| WO | 03022408 A1 | 3/2003 |
| WO | 2011149724 A2 | 12/2011 |

\* cited by examiner

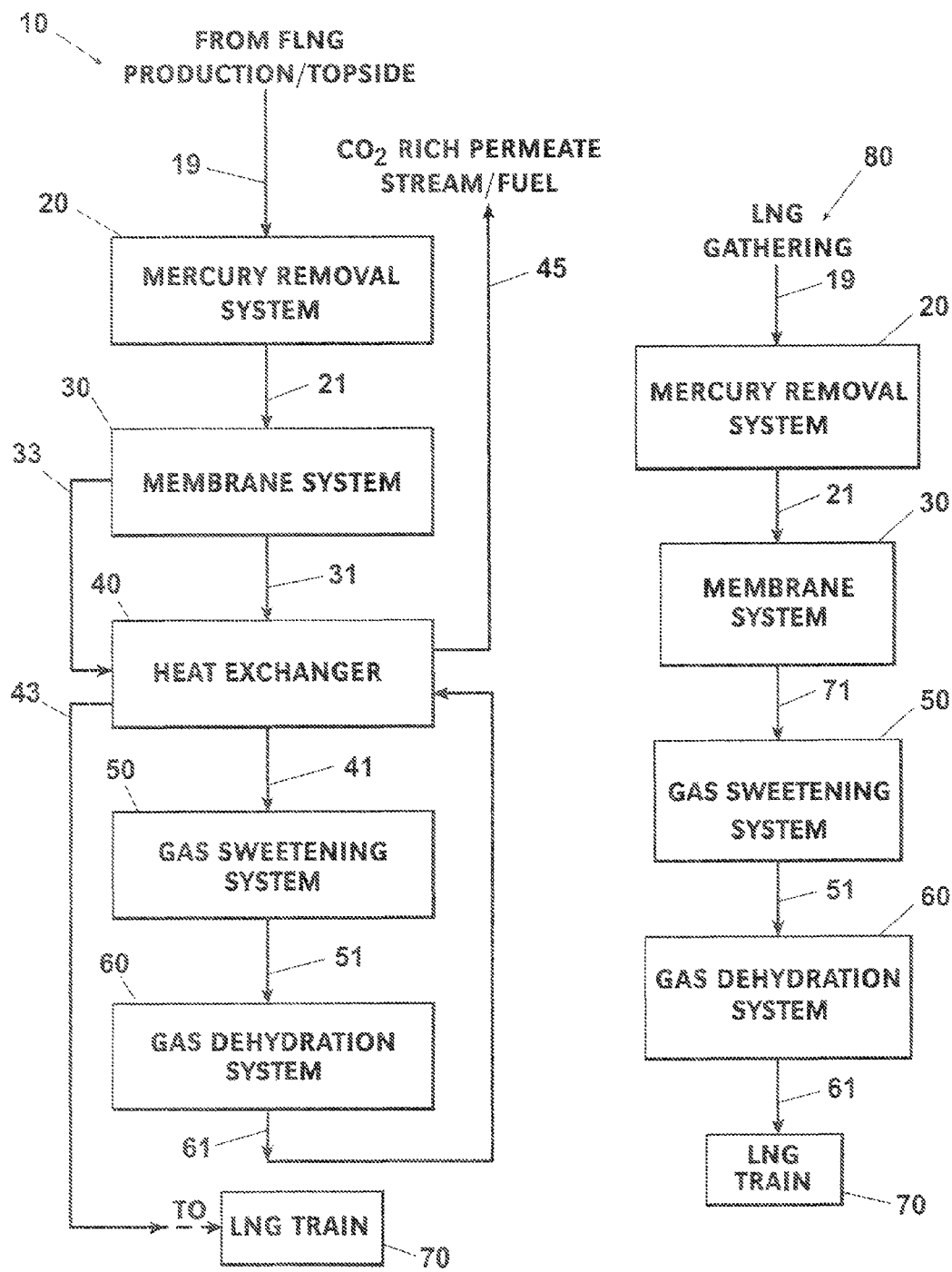

FLOATING LIQUEFIED NATURAL GAS PRETREATMENT SYSTEM

CROSS-REFERENCE TO PENDING APPLICATIONS

This application claims priority to U.S. Provisional Patent Application No. 61/567,406, filed on Dec. 6, 2011.

BACKGROUND OF THE INVENTION

Offshore production facilities use pipelines to transport natural gas extracted from deep sea gas fields or gas-laden oil-rich fields to processing facilities located on the nearest shore. These onshore facilities chill the natural gas, which turns the gas into a liquid and shrinks its volume by about 600 times. This chilling is accomplished by a liquefied natural gas ("LNG") refrigeration train (or, simply, an LNG train). The LNG produced by the train is then loaded onto ships for transportation to customers. Alternatively, in a very different and new processing approach, the natural gas is processed into LNG at sea on board a ship. Such ships are known as floating liquefied natural gas ("FLNG") facilities.

Regardless of whether the gas is being liquefied at an onshore facility or at sea, some pretreatment of the incoming natural gas stream is required to remove contaminants, such as water, carbon dioxide, hydrogen sulfide, and mercury, so that the gas stream being processed by the LNG train is about 99 percent pure gas. This pretreatment is usually accomplished by way of an amine unit, which removes hydrogen sulfide and carbon dioxide, and a dehydration unit, which removes water. The pretreatment system then delivers the substantially pure natural gas stream to the LNG train at a temperature of about 37° C. to 49° C. (100° F. to 120° F.).

Energy consumption is a key cost driver in all LNG trains. In particular, the natural gas stream must be cooled or refrigerated to about −160° C. (−256° F.) to make LNG. Because the refrigeration process consumes more energy than any other process in the LNG train, energy optimization and conservation are key design considerations. The volumes of gas being treated are typically very large, so even small decreases in the temperature of the incoming gas stream to the LNG train may translate into significant energy and cost savings.

A FLNG train has additional challenges in this regard because of its location offshore and the limited amount of space available aboard ship. For example, the footprint of an FLNG train may be about one-fourth the size of an onshore LNG processing facility with equivalent capacity. A need exists for a pretreatment system that has a smaller footprint than conventional pretreatment systems and that can deliver the incoming gas stream to the LNG train at a lower temperature, thereby reducing the amount of energy required for the refrigeration process.

SUMMARY OF THE INVENTION

An embodiment of a pretreatment system for a FLNG facility is presented. The pretreatment system includes a membrane system that removes carbon dioxide from an inlet natural gas stream, producing a cooled $CO_2$-rich permeate stream and a cooled $CO_2$-depleted non-permeate stream. The system also includes a heat exchanger that cross-exchanges heat from the cooled non-permeate and permeate streams with the substantially water-free natural gas outlet stream to produce a first cooled $CO_2$-depleted non-permeate stream and a second cooled $CO_2$-depleted non-permeate stream. The first cooled $CO_2$-depleted non-permeate stream is routed to additional pretreatment equipment, while the second cooled $CO_2$-depleted non-permeate stream is routed directly to a LNG train. The pretreatment system may also include mercury removal, gas sweetening, and gas dehydration.

Another embodiment of a pretreatment system for a FLNG facility includes a mercury removal system that removes mercury from an inlet natural gas stream to produce a substantially mercury-free natural gas stream, a membrane system that removes carbon dioxide from the substantially mercury-free natural gas stream to produce a cooled $CO_2$-depleted non-permeate stream, a gas sweetening system that processes the cooled $CO_2$-depleted non-permeate stream to form a sweetened natural gas stream, and a gas dehydration system that removes water from the sweetened natural gas stream to form a substantially water-free natural gas outlet stream. The substantially water-free natural gas outlet stream is fed to a LNG train.

A pretreatment method for cooling and purifying a natural gas stream so that it can be processed into LNG is also presented. The steps of the method include passing an inlet natural gas stream through a membrane system to produce a cooled $CO_2$-rich permeate stream and a cooled $CO_2$-depleted non-permeate stream, cross-exchanging heat from the non-permeate and permeate streams and a substantially water-free natural gas outlet stream in a heat exchanger to produce a first cooled $CO_2$-depleted non-permeate stream and a second cooled CO2-depleted non-permeate stream, routing the first cooled $CO_2$-depleted non-permeate stream to additional pretreatment equipment, and directing the second cooled $CO_2$-depleted non-permeate stream directly to a LNG train. Additional processing steps may include mercury removal, gas sweetening, and gas dehydration.

Objects of the invention are to (1) conserve energy by reducing the amount needed by the LNG train to refrigerate natural gas; (2) improve energy efficiency of the LNG train; (3) reduce capital equipment and operating costs; (4) reduce the design sizes of the equipment associated with certain steps in the pretreatment process; and (5) minimize the overall amount of space necessary to convert the inlet natural gas stream to LNG.

A better understanding of the invention will be obtained from the following detailed description of the preferred embodiments taken in conjunction with the drawings and the attached claims.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

FIG. 2 is a simplified process flow diagram of a preferred embodiment of a pretreatment system, according to an embodiment of the present invention. The pretreatment system purifies and cools the inlet natural gas stream before it enters the LNG train, and is well-suited for use in the FLNG facility of FIG. 1.

FIG. 3 is a simplified process flow diagram of another preferred embodiment of a pretreatment system, according

DETAILED DESCRIPTION OF THE PREFERRED EMBODIMENTS

Figure 1:
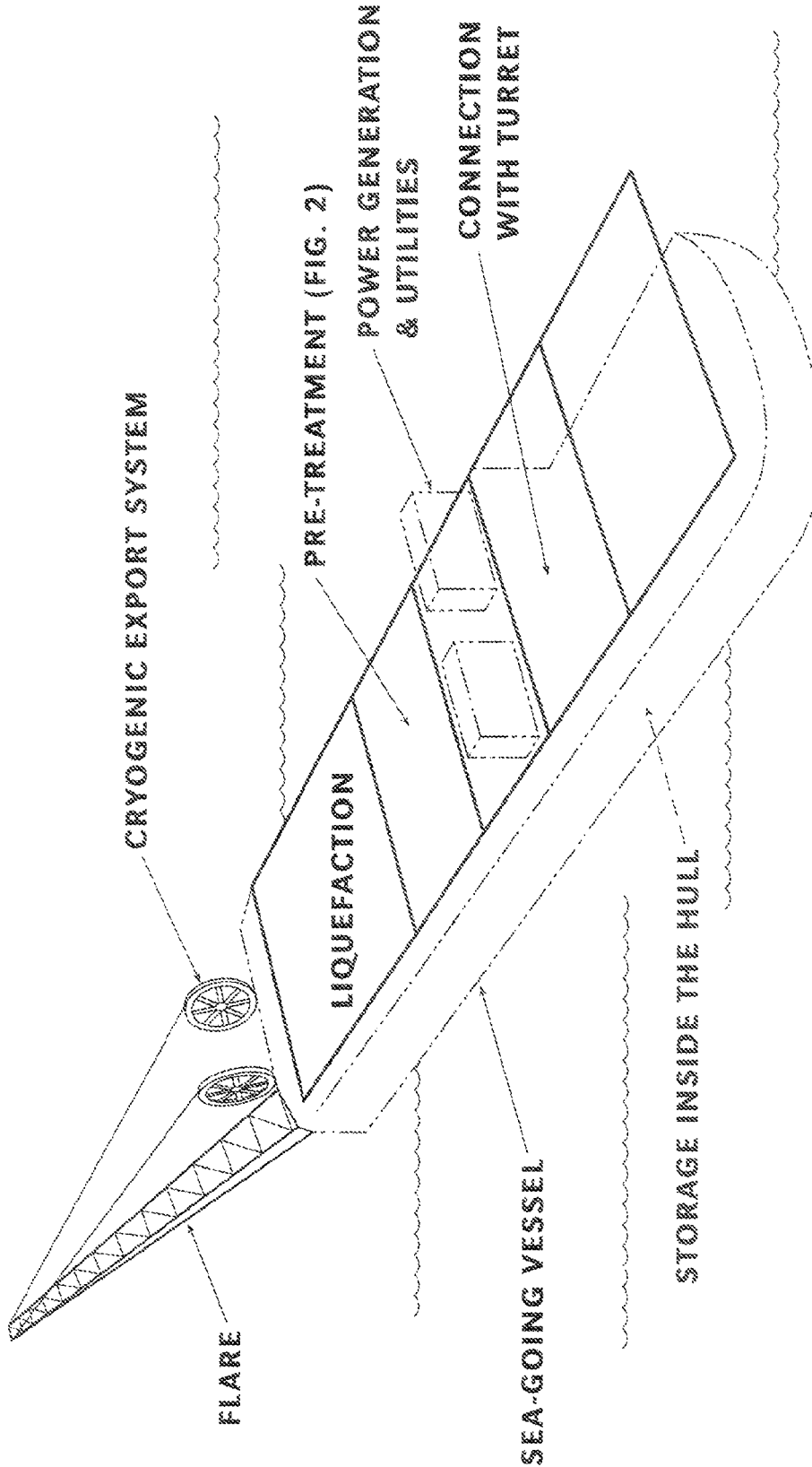
FIG. 1 is a general layout of a FLNG facility showing a pretreatment system located upstream of the LNG train, according to an embodiment of the present invention.

It is to be understood that the invention that is now to be described is not limited in its application to the details of the construction and arrangement of the parts illustrated in the accompanying drawings. The invention is capable of other embodiments and of being practiced or carried out in a variety of ways. The phraseology and terminology employed herein are for purposes of description and not limitation.

Elements shown by the drawings are identified by the following numbers:
10 From FLNG production/topside
19 Inlet natural gas stream
20 Mercury removal system
21 Substantially mercury-free natural gas stream
30 Membrane system
31 Cooled $CO_2$-rich permeate stream
33 Cooled $CO_2$-depleted non-permeate stream
40 Heat exchanger
41 First cooled $CO_2$-depleted non-permeate stream
43 Second cooled $CO_2$-depleted non-permeate stream
45 Heated $CO_2$-rich permeate stream
50 Gas sweetening system
51 Sweetened natural gas stream
60 Gas dehydration system
61 Substantially water-free natural gas outlet stream
70 To LNG train
71 Single cooled $CO_2$-depleted non-permeate stream
80 LNG gathering system This invention describes a pretreatment system that delivers the incoming gas stream to the LNG train at a lower temperature than conventional systems. As a result, less energy is needed to convert the gas stream to LNG. In addition, the pretreatment system has a smaller footprint than conventional pretreatment systems.

As shown in FIG. 1, a FLNG system aboard a sea-going vessel includes areas for power generation and utilities, pretreatment of the incoming natural gas stream, liquefaction of the natural gas into LNG, and LNG storage. The system also includes means for flaring excess natural gas and means, such as a cryogenic export system, for transferring LNG from the vessel to the next point of delivery. The pretreatment system may be located anywhere on the vessel but is generally placed near the LNG train. FIG. 2 and FIG. 3 show potential embodiments of the pretreatment system described herein.

As shown in FIG. 2, a pretreatment system to cool and purify the inlet natural gas stream may include multiple components. One component may be a mercury removal system 20, which may be a PURASPEC$_{JM}$™ mercury/$H_2S$ removal bed (Johnson Matthey Catalysts, Houston, Tex.) or its equivalent. The mercury removal system 20 removes the mercury from the inlet natural gas stream 19 to form a substantially mercury-free natural gas stream 21. The substantially mercury-free natural gas stream 21 may then be passed through a membrane system 30. Alternatively, the mercury/$H_2S$ removal bed may be installed downstream of the gas dehydration system 60.

The membrane system 30 may be primarily responsible for removing carbon dioxide from the substantially mercury-free natural gas stream 21. As an example, the membrane system 30 is preferably one or more CYNARA® $CO_2$ removal membrane systems (Cameron Process Systems, Houston, Tex.) or its equivalent. As the substantially mercury-free natural gas stream 21 passes through the membrane system 30, it is naturally cooled to produce a cooled $CO_2$-rich permeate stream 31 and a cooled $CO_2$-depleted non-permeate stream 33. Both non-permeate and permeate streams 31, 33 may then be fed to a heat exchanger 40.

In the heat exchanger 40, heat from the cooled $CO_2$-rich permeate stream 31 and the cooled $CO_2$-depleted non-permeate stream 33 is cross-exchanged with a substantially water-free natural gas outlet stream 61 from a gas dehydration system 60 to produce a first cooled $CO_2$-depleted non-permeate stream 41, a second cooled $CO_2$-depleted non-permeate stream 43, and a heated $CO_2$-rich permeate stream 45. The heated $CO_2$-rich permeate stream 45 leaves the pretreatment system and is used as fuel or can be reinjected.

After leaving the heat exchanger 40, the first cooled $CO_2$-depleted non-permeate stream 41 may pass through a gas sweetening system 50 that produces a sweetened natural gas stream 51. As an example, the gas sweetening system 50 may be a hybrid system that includes a membrane system for removing carbon dioxide and hydrogen sulfide followed by an amine unit for removing carbon dioxide and hydrogen sulfide to the level required by the downstream refrigeration unit. The sweetened natural gas stream 51 may then pass through a gas dehydration system 60. The gas dehydration system 60 removes water from the sweetened natural gas stream 51 to produce a substantially water-free natural gas outlet stream 61 which is fed to the heat exchanger 40. The gas dehydration system 60 may include, but is not limited to, molecular sieves and hydrocarbon dew pointing.

The second cooled $CO_2$-depleted non-permeate stream 43 may leave the heat exchanger 40 and be routed directly to a LNG train 70. Because the second cooled $CO_2$-depleted non-permeate stream 43 has been cooled by the membrane system 30 and further cooled by the heat exchanger 40, the temperature at which it is delivered to the LNG train 70 is significantly reduced when compared to conventional pretreatment systems. For example, the temperature of the second cooled $CO_2$-depleted non-permeate stream 43 may be about 15° C. to 21° C. (60° F. to 70° F.), while the temperature at which a conventional pretreatment system delivers natural gas to a LNG train is about 37° C. to 48° C. (100° F. to 120° F.). Delivering the second cooled $CO_2$-depleted non-permeate stream 43 to the LNG train 70 at a cooler temperature reduces the overall LNG refrigeration load and the amount of energy required.

As another example, the temperature of the outlet gas from a conventional pretreatment system may range from about 41° C. to 43° C. (105° F. to 110° F.). A dual-mixed refrigerant system with a design capacity of two million tons per annum ("mtpa") LNG requires 62 megawatts ("MW") of energy to convert outlet gas at that temperature to LNG. In contrast, as shown in the table below, the outlet gas temperature for the pretreatment system of the present invention ranges from about 26° C. to 35° C. (78° F. to 95° F.) as carbon dioxide inlet and outlet concentrations vary:

| Feed Gas $CO_2$ (mol %) | Product Gas $CO_2$ (mol %) | Predicted Outlet Gas Temperature (° C.) | Predicted Outlet Gas Temperature (° F.) |
| --- | --- | --- | --- |
| 20 | 7 | 26 | 78 |
| 15 | 7 | 29 | 84 |

-continued

| Feed Gas $CO_2$ (mol %) | Product Gas $CO_2$ (mol %) | Predicted Outlet Gas Temperature (° C.) | Predicted Outlet Gas Temperature (° F.) |
|---|---|---|---|
| 10 | 7 | 32 | 89 |
| 7 | 3 | 33 | 91 |
| 5 | 3 | 35 | 95 |

Because the temperature of the outlet gas is lower, the LNG train requires less energy to convert the outlet gas to LNG. This energy savings when compared to the conventional pretreatment system is about five to fifteen percent.

Like the second cooled $CO_2$-depleted non-permeate stream 43, the first cooled $CO_2$-depleted non-permeate stream 41 may also pass through the membrane system 30 and the heat exchanger 40, reducing its temperature before it enters the gas dehydration system 60. In addition, the second cooled $CO_2$-depleted non-permeate stream 43 entirely bypasses the gas dehydration system 60. As a result, the gas dehydration system 60 has to treat less gas, and the gas that it does treat is at a lower temperature. The size of the gas dehydration system 60 may therefore be reduced, and the pretreatment system requires less floor space than conventional pretreatment systems.

As an alternative, the first and second cooled $CO_2$-depleted non-permeate streams 41, 43 may be used to cool the inlet natural gas stream 19, the substantially mercury-free natural gas stream 21, or both. If the natural gas is rich in heavy hydrocarbons, this cooling results in heavy hydrocarbon and water condensation in the inlet gas stream. This reduces the amount of water and heavy hydrocarbons that enter the pretreatment system, thereby reducing the overall processing load on the pretreatment section of the FLNG system.

An alternate embodiment of a FLNG pretreatment system to cool and purify an inlet stream of natural gas is shown in FIG. 3. The inlet natural gas stream 19 from the LNG gathering system 80 may first be sent to a mercury removal system 20, which removes the mercury from the inlet natural gas stream 19 to form a substantially mercury-free natural gas stream 21. The substantially mercury-free natural gas stream 21 may then be passed to a membrane system 30, which is primarily responsible for removing carbon dioxide from the substantially mercury-free natural gas stream 21. The membrane system 30 also naturally cools the substantially mercury-free natural gas stream 21 to produce a single cooled $CO_2$-depleted non-permeate stream 71. The single cooled $CO_2$-depleted non-permeate stream 71 may then pass through a gas sweetening system 50 that produces a sweetened natural gas stream 51. The sweetened natural gas stream 51 may then pass through a gas dehydration system 60, which removes water from the sweetened natural gas stream 51 to produce a substantially water-free natural gas outlet stream 61 which is fed to the LNG train 70. Passing through the membrane system 30 reduces the temperature of the single cooled $CO_2$-depleted non-permeate stream 71. As a result, downstream treatment equipment may be reduced in size and less energy is required to convert the substantially water-free natural gas outlet stream 61 to LNG.

A FLNG pretreatment system and method have been disclosed. While the invention has been described with a certain degree of particularity, it is manifest that many changes may be made in the details of construction, the types and arrangement of components, and the number and order of pretreatment steps without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

What is claimed is:

1. A pretreatment method for cooling and purifying a natural gas stream for processing into LNG, the method comprising:
    passing an inlet natural gas stream through a membrane system to produce a cooled $CO_2$-rich permeate stream and a cooled $CO_2$-depleted non-permeate stream;
    routing the cooled CO2-rich permeate stream and the cooled CO2-depleted non-permeate stream directly to a heat exchanger;
    cross-exchanging heat in the heat exchanger between the cooled $CO_2$-rich permeate stream and the cooled $CO_2$-depleted non-permeate stream with a substantially water-free natural gas outlet stream of a gas dehydration unit to produce a heated $CO_2$-rich permeate stream, a first cooled $CO_2$-depleted non-permeate stream and a second cooled CO2-depleted non-permeate stream;
    routing the first cooled $CO_2$-depleted non-permeate stream to additional pretreatment equipment; and
    directing the second cooled $CO_2$-depleted non-permeate stream directly to a LNG train.

2. A pretreatment method according to claim 1 further comprising processing the inlet natural gas stream in a mercury removal system to form a substantially mercury-free natural gas stream.

3. A pretreatment method according to claim 2 wherein the mercury removal system is a mercury/$H_2S$ removal bed.

4. A pretreatment method according to claim 1 further comprising removing mercury to a level required to protect downstream equipment.

5. A pretreatment method according to claim 1 wherein the additional pretreatment equipment is chosen from the group consisting of a gas sweetening system and a gas dehydration system.

6. A pretreatment method according to claim 1 wherein the membrane system is a $CO_2$ removal membrane system.

7. A pretreatment method according to claim 2 wherein the mercury removal system is located after the additional pretreatment equipment.

* * * * *